United States Patent
Mehta et al.

(10) Patent No.: US 11,403,733 B2
(45) Date of Patent: Aug. 2, 2022

(54) SYSTEMS AND METHODS FOR IMAGE SUPER-RESOLUTION USING ITERATIVE COLLABORATIVE FILTERING

(71) Applicant: TELEDYNE FLIR, LLC, Thousand Oaks, CA (US)

(72) Inventors: Rakesh Mehta, Tampere (FI); Karen Egiazarian, Tampere (FI)

(73) Assignee: Teledyne FLIR, LLC, Thousand Oaks, CA (US)

( * ) Notice: Subject to any disclaimer, the term of this patent is extended or adjusted under 35 U.S.C. 154(b) by 171 days.

(21) Appl. No.: 16/033,132

(22) Filed: Jul. 11, 2018

(65) Prior Publication Data
US 2018/0330474 A1   Nov. 15, 2018

Related U.S. Application Data

(63) Continuation of application No. PCT/US2017/013563, filed on Jan. 13, 2017.
(Continued)

(51) Int. Cl.
*G06T 3/40* (2006.01)

(52) U.S. Cl.
CPC .......... *G06T 3/4061* (2013.01); *G06T 3/4076* (2013.01); *G06T 3/4084* (2013.01)

(58) Field of Classification Search
None
See application file for complete search history.

(56) References Cited

U.S. PATENT DOCUMENTS

2015/0023611 A1 * 1/2015 Salvador ............... G06T 3/4053
                                                               382/263
2015/0071545 A1 * 3/2015 Yang .................... G06K 9/4609
                                                               382/190
(Continued)

FOREIGN PATENT DOCUMENTS

WO   WO 2013/131851     9/2013
WO   WO 2014/154773    10/2014
(Continued)

OTHER PUBLICATIONS

Kim, K.I.—"Example-based Learning for Single-Image Super-Resolution and JPEG Artifact Removal"—TR-173—Aug. 2008, pp. 1-27 (Year: 2008).*

(Continued)

*Primary Examiner* — Bernard Krasnic
(74) *Attorney, Agent, or Firm* — Haynes and Boone, LLP

(57) ABSTRACT

Various techniques are disclosed for systems and methods to provide image resolution enhancement. For example, a method includes: receiving an original image (e.g., a visible light image) of a scene comprising image pixels identified by pixel coordinates; resizing the original image to a larger size, where the resized image is divided into a first plurality of reference blocks; enhancing a resolution of the resized image by iteratively: injecting high frequency data into the resized image, extracting from the resized image a first plurality of matching blocks that meet a mutual similarity condition with respect to the reference block, and adjusting the high frequency data of the reference block based on a correlation between the reference block and the first plurality of matching blocks. A system configured to perform such a method is also disclosed.

20 Claims, 8 Drawing Sheets

Related U.S. Application Data

(60) Provisional application No. 62/279,743, filed on Jan. 16, 2016.

(56) References Cited

U.S. PATENT DOCUMENTS

| | | | |
|---|---|---|---|
| 2015/0104116 A1* | 4/2015 | Salvador | G06T 3/4053 382/300 |
| 2015/0161436 A1* | 6/2015 | Fan | G06K 9/6267 382/225 |
| 2015/0187053 A1* | 7/2015 | Chen | G06T 5/20 382/264 |
| 2017/0069059 A1* | 3/2017 | Urfalioglu | G06T 5/002 |
| 2017/0178293 A1* | 6/2017 | Salvador Marcos | G06K 9/52 |
| 2017/0206633 A1* | 7/2017 | Gandolph | G06T 5/50 |
| 2018/0139447 A1* | 5/2018 | Zhou | H04N 21/234363 |

FOREIGN PATENT DOCUMENTS

| | | | | |
|---|---|---|---|---|
| WO | WO-2015121422 A1 * | 8/2015 | | G06T 7/0002 |
| WO | WO-2016005242 A1 * | 1/2016 | | G06T 5/50 |

OTHER PUBLICATIONS

Bevilacqua et al., "Low-Complexity Single-Image Super-Resolution Based on Nonnegative Neighbor Embedding", BMVC, 2012, pp. 1-10.
Buades et al., "A Non-Local Algorithm for Image Denoising", IEEE Conference on Computer Vision and Pattern Recognition, 2005, pp. 60-65, vol. 2.
Chang et al., "Super-Resolution Through Neighbor Embedding", IEEE Conference on Computer Vision and Pattern Recognition, 2004, 8 Pages, vol. 1.
Cui et al., "Deep Network Cascade for Image Super-Resolution", Computer Vision—ECCV 2014, 2014, pp. 49-64, Springer.
Dabov et al., "Image Denoising by Sparse 3-D Transform-Domain Collaborative Filtering", IEEE Transactions on Image Processing, Aug. 2007, pp. 2080-2095, vol. 16, No. 8.
Danielyan et al., "Image Upsampling Via Spatially Adaptive Block-Matching Filtering", 16$^{th}$ European Signal Processing Conference (EUSIPCO 2008), Aug. 25-29, 2008, 5 Pages, Lausanne, Switzerland.
Danielyan et al., "Spatially Adaptive Filtering as Regularization in Inverse Imaging: Compressive Sensing, Super-Resolution and Upsampling", Jan. 1, 2010, pp. 3-33. Retrieved from the Internet: <https://www.researchgate.net/publication/241194459_Spatially_adaptive_filtering_as_regularization_in_inverse_imaging_Compressive_sensing_super-resolution_and_upsampling>.
Dong et al., Learning a Deep Convolutional Network for Image Super-Resolution, Computer Vision—ECCV 2014, 2014, pp. 184-199, Springer.
Ebrahimi et al., "Solving the Inverse Problem of Image Zooming Using Self-Examples", Image analysis and Recognition, 2007, pp. 117-130, Springer.
Egiazarian et al., "Single Image Super-Resolution Via BM3D Sparse Coding", 23$^{rd}$ European Signal Processing Conference (EUSIPCO), 2015, pp. 2899-2903.
Fernandez-Granda et al., "Super-Resolution Via Transform-Invariant Group-Sparse Regularization", IEEE International Conference on Computer Vision, Dec. 2013, pp. 3336-3343.
Freedman et al., "Image and Video Upscaling from Local Self-Examples", ACM Transactions on Graphics (TOG), 2011, pp. 1-11, vol. 30, No. 2.
Freeman et al., "Example-Based Super-Resolution", IEEE Computer Graphics and Applications, Mar./Apr. 2002, pp. 56-65, vol. 22, Issue 2.
Glasner et al., "Super-Resolution from a Single Image", International Conference on Computer Vision, 2009, pp. 349-356.
Hacohen et al., "Image Upsampling Via Texture Hallucination", IEEE International Conference on Computational Photography, 2010, pp. 1-8.
Huang et al., "Single Image Super-Resolution from Transformed Self-Exemplars", IEEE Conference on Computer Vision and Pattern Recognition, Jun. 2015, pp. 5197-5206.
Irani et al., "Improving Resolution by Image Registration", CVGIP: Graphical Models and Image Processing, May 1991, pp. 231-239, vol. 53, No. 3.
Maggioni et al., "Video Denoising, Deblocking, and Enhancement Through Separable 4-D Nonlocal Spationtemporal Transforms", IEEE Transactions on Image Processing, Sep. 2012, pp. 3952-3966, vol. 21, No. 9.
Salvador et al., "Naïve Bayes Super-Resolution Forest", IEEE International Conference on Computer Vision (ICCV), Dec. 7-13, 2015, pp. 325-333.
Schulter et al., Fast and Accurate Image Upscaling with Super-Resolution Forests, IEEE Conference on Computer Vision and Pattern Recognition, 2015, pp. 3791-3799.
Shechtman et al., "Matching Local Self-Similarities Across Images and Videos", IEEE Conference on Computer Vision and Pattern Recognition, Jun. 17-22, 2007, 8 Pages.
Singh et al., "Super-Resolving Noisy Images", IEEE Conference on Computer Vision and Pattern Recognition, Jun. 23-28, 2014, pp. 1-8.
Sun et al., "Context-Constrained Hallucination for Image Super-Resolution", IEEE Computer Society Conference on Computer Vision and Pattern Recognition, Jun. 13-18, 2010, pp. 1-8.
Sun et al., "Gradient Profile Prior and Its Applications in Image Super-Resolution and Enhancement", IEEE Transactions on Image Processing, 2011, pp. 1529-1542. vol. 20, No. 6.
Sun et al., "Super-Resolution from Internet-Scale Scene Matching", IEEE International Conference on Computational Photography, 2012, pp. 1-12, 2012.
Timofte et al., Adjusted Anchored Neighborhood Regression for Fast Super-Resolution, Computer Vision—ACCV 2014, Nov. 2014, pp. 111-126, Springer.
Timofte et al., "Anchored Neighborhood Regression for Fast Example-Based Super-Resolution", IEEE International Conference on Computer Vision, Dec. 2013, pp. 1920-1927.
Yang et al., "Couple Dictionary Training for Image Super-Resolution", IEEE Transactions on Image Processing, 2012, pp. 3467-3478, vol. 21, Issue 8.
Yang et al., "Fast Direct Super-Resolution by Simple Functions", IEEE International Conference on Computer Vision, Dec. 1-8, 2013, pp. 561-568.
Yang et al., "Image Super-Resolution Via Sparse Representation", IEEE Transactions on Image Processing, May 18, 2010, pp. 2861-2873, vol. 19, Issue 11.
Zeyde et al., "On Single Image Scale-Up Using Sparse-Representations", Curves and Surfaces, 2010, pp. 711-730, Springer.
Zhu et al., "Single Image Super-Resolution Using Deformable Patches", Proc IEEE Computer Society Conference Computer Vision Pattern Recognition, Jun. 2014, pp. 2917-2924.

* cited by examiner

SYSTEMS AND METHODS FOR IMAGE SUPER-RESOLUTION USING ITERATIVE COLLABORATIVE FILTERING

CROSS-REFERENCE TO RELATED APPLICATIONS

This application is a continuation of International Patent Application No. PCT/US2017/013563 filed Jan. 13, 2017 and entitled "SYSTEMS AND METHODS FOR IMAGE SUPER-RESOLUTION USING ITERATIVE COLLABORATIVE FILTERING," which is incorporated herein by reference in its entirety.

International Patent Application No. PCT/US2017/013563 filed Jan. 13, 2017 claims priority to and the benefit of U.S. Provisional Patent Application No. 62/279,743 filed Jan. 16, 2016 and entitled "SYSTEMS AND METHODS FOR IMAGE SUPER-RESOLUTION USING ITERATIVE COLLABORATIVE FILTERING," which is incorporated herein by reference in its entirety.

TECHNICAL FIELD

One or more embodiments of the invention relate generally to imaging processing and more particularly, for example, to enhancement of the resolution of images.

BACKGROUND

Super-resolution techniques have been developed to enhance the resolution of imaging systems or images captured by such systems. However, conventional super-resolution techniques either require large amount of training time and processing resources (e.g., processing time, memory space, data storage space, etc.), such as those techniques that are based on external training data compiled in a dictionary, or produce poor resolution enhancement quality, such as those techniques that select a best matching patch within the same image to estimate high frequency data. As such, conventional super-resolution techniques are inadequate to efficiently bring out the true structural details and definition that would be captured in a truly higher resolution version of the images.

Such shortcomings of conventional super-resolution techniques generally make them unsuitable for devices with limited processing resources (such as security camera systems, portable devices, etc.) to achieve a desired image resolution. Thus, there is a need for improved super-resolution techniques for producing high quality super-resolution images without consuming large amounts of processing resources.

SUMMARY

Various techniques are disclosed for systems and methods to enhance a resolution, definition, and/or signal-to-noise ratio (SNR) of images to provide sharper, easier-to-interpret, more visually pleasing, and more content-rich images and videos for viewing and for further image processing. For example, in one embodiment, a method includes: resizing an original image to a larger size, the resized image has an image dimension that is larger than the image dimension of the original image, and where the resized image is divided into a first plurality of reference blocks; enhancing a resolution of the resized image by iteratively: injecting high frequency data into the resized image; for each reference block, extracting, from the resized image, a first plurality of matching blocks that meet a mutual similarity condition with respect to the reference block; and adjusting the high frequency data of the reference block based on a correlation between the reference block and the first plurality of matching blocks.

The high frequency data that is injected into the resized image may be generated using various techniques in accordance with an embodiment of the disclosure. For example, the high frequency data may be generated based on pixel data of the resized image. Specifically, the high frequency data may be generated based on a difference between the resized image and the original image.

In addition to adjusting the high frequency data of the reference block, the method according to one embodiment also adjusts the high frequency data of the first plurality of reference blocks. In some of these embodiments, the method jointly adjust the high frequency data of the reference block and the first plurality of matching blocks together as a group, so that components of the high frequency data that are consistent in the group are retained while components of the high frequency data that are inconsistent in the group are removed.

In this regard, the reference block and the first plurality of matching blocks are arranged to form a three-dimensional (3D) array of pixel. For example, the matching blocks and reference block may be aligned on top of each other to form the stack of 3D pixel array. A 3D transformation is then performed on the 3D pixel array. Various 3D transformations may be performed on the 3D pixel array. The 3D transformations may include at least one of the followings: a Discrete Cosine Transform, a Haar Transform, an Identity Transform, or any combination thereof. In some embodiments, the 3D transformation includes a two-dimensional (2D) image transform and a one-dimensional (1D) image transform. For example, the 2D image transform may be applied to pixel values along a first dimension and a second dimension of the 3D array of pixels, and the 1D image transform may be applied to a third dimension of the 3D array of pixels. The method also includes modifying at least some of the spectral coefficients in each of the 3D spectra based at least in part on corresponding coefficient standard deviations and applying, to the 3D spectra, an inverse transform to generate high resolution estimates for the resized image.

The first plurality of reference blocks may be distinct, non-overlapping pixel blocks of the resized image, where each reference block comprises a plurality of contiguous pixels. The matching blocks extracted for a reference block have the same size as the reference block. In addition, the matching blocks may be partially overlapping with each other. The matching blocks can be identified and extracted for each reference block using various techniques in accordance with an embodiment of the disclosure. For example, an incremental search approach may be adapted to identify the match blocks for a reference block. Under the incremental search approach, a local search area is initially defined. The local search area is a portion of the resized image that at least partially surrounds the reference block. The method according to an embodiment of the disclosure searches within the defined local search area to identify several matching blocks that meet the mutual similarity condition, that is, the matching blocks are mutually similar with each other and with the corresponding reference block.

Under the incremental search approach, if the number of identified matching blocks is less than a predetermined threshold, the search area may be expanded, and a search for matching blocks is performed within the expanded search area. This way, additional matching blocks may be identified in the additional search area. The search area may be continually expanded until the number of identified matching blocks has reached a threshold. Once a set of matching blocks is identified for a corresponding reference block, image data or pixel data of the matching blocks are extracted. It is noted that in some embodiments, the identification of the matching blocks for each reference block may be performed prior to iteratively injecting and adjusting the high frequency data.

In some embodiments, the method includes dividing the resized image into a second plurality of reference blocks, where each reference block in the second plurality of reference blocks has a smaller size than the reference block in the first plurality of reference block. The method also includes in at least one iteration of the enhancing the resolution of the resized image, for each reference block in the second plurality of reference blocks, extracting from the resized image, a second plurality of matching blocks that meet a mutual similarity condition with respect to the reference block; and adjusting the high frequency data of the reference block based on a correlation among the reference block and the second plurality of matching blocks. Similar to the first plurality of matching blocks, the high frequency data of the reference block and the second plurality of matching blocks may be jointly adjusted as a group so that components of the high frequency data that are consistent in the group are retained while components of the high frequency data that are inconsistent in the group are removed.

In this regard, the second plurality of matching blocks and the reference block may be arranged to form a 3D pixel array. Various transformations may also be performed on the 3D pixel array. The method in accordance with some embodiments of the disclosure may perform different transformations on the 3D pixel array created by the second plurality of matching blocks than the transformations that were performed on the 3D pixel array created by the first plurality of matching blocks.

Furthermore, the steps of enhancing the resolution of the resized image can be iterated as many times as desired. In some embodiments, the size of the second plurality of reference blocks may be modified after a number of iterations of enhancing the resolution has been performed.

In another embodiment, a system includes: an image interface configured to receive an original image; and a processor communicatively coupled with the image interface and configured to resize the original image to a larger size; enhance a resolution of the resized image by iteratively: injecting high frequency data into the resized image; dividing the resized image into a first plurality of reference blocks; for each reference block, extracting, from the resized image, a first plurality of matching blocks that meet a mutual similarity condition with respect to the reference block and adjusting the high frequency data of the reference block based on a correlation between the reference block and the first plurality of matching blocks.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
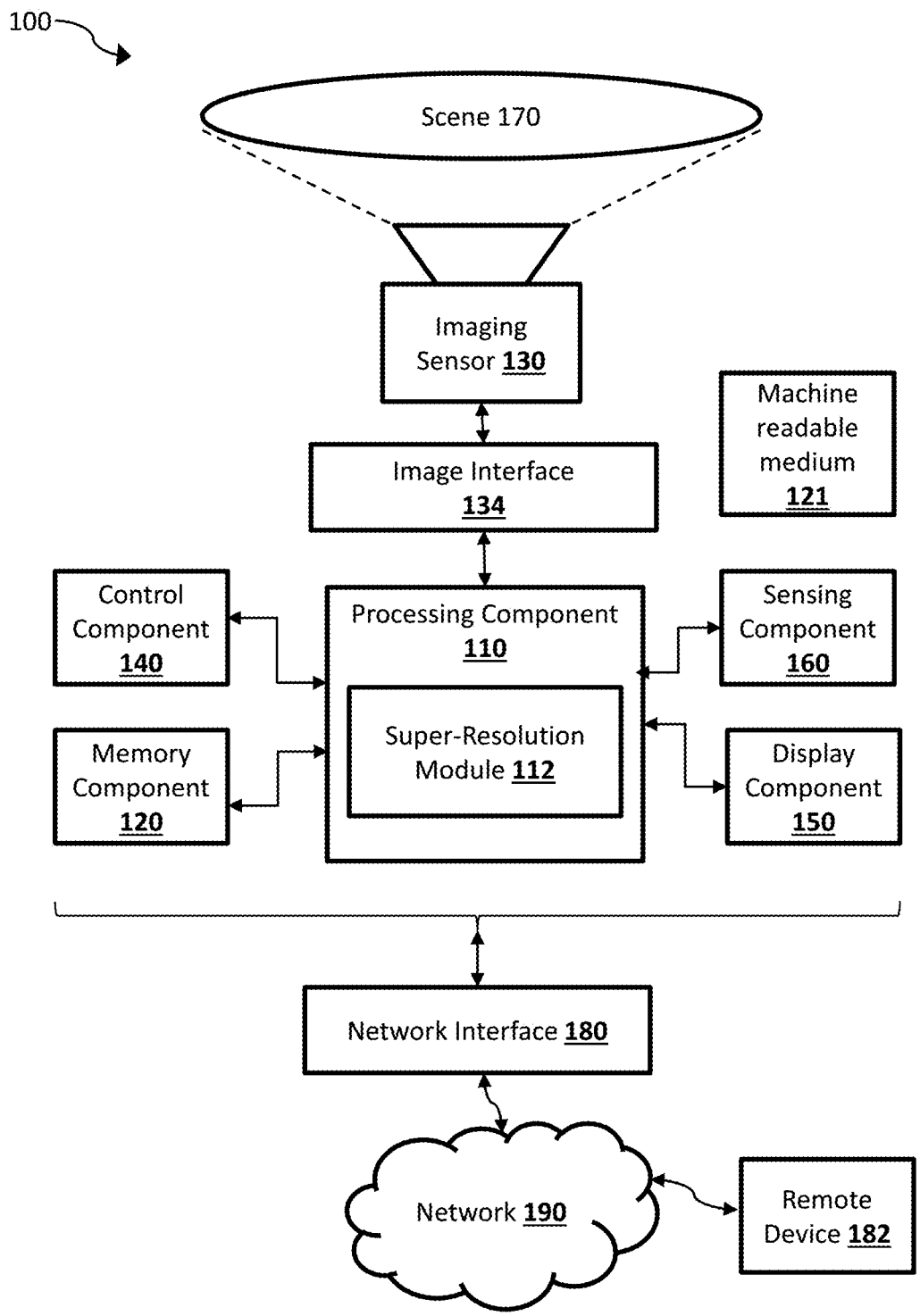
FIG. 1 illustrates a block diagram of an imaging system in accordance with an embodiment of the disclosure.

Various embodiments of the methods and systems disclosed herein may be used to provide resolution enhancement (also referred to herein as "super-resolution") of images (e.g., including still images and video frames) that have a lower resolution, lower definition, and/or lower signal-to-noise ratio (SNR) than desired. Such low resolution, definition, and/or SNR images may, for example, be captured by an imaging sensor or device that typically has a lower resolution, lower definition, and/or lower SNR than a CMOS, CCD, or other visible-light imaging sensor. For example, various imaging sensors and devices, such as infrared (IR) imaging sensors, photonic mixer devices (PMD) or other time-of-flight (ToF) imaging sensors, laser imaging detection and ranging (LIDAR) devices, and positron emission tomography (PET), single-photon emission computed tomography (SPECT), ultrasound imaging, or other medical imaging devices, operate in modalities or spectra that make it expensive or otherwise difficult to produce a high resolution, high definition, and/or high SNR output directly.

Systems and methods according to one or more embodiments of the disclosure can increase the resolution, definition, and/or SNR of such a low fidelity (e.g., low resolution, definition, and/or SNR) image of a scene (to "super-resolve" images, as also referred to herein) by iteratively injecting high frequency data into the image and then adjusting the high frequency data using information derived from different portions (also referred to as "patches" or "blocks" herein) of the same image that are mutually similar.

In particular, according to one or more embodiments, an original low resolution image may first be resized to a larger size by, for example, using bicubic interpolation. High frequency data may then be injected into the resized image. The high frequency data may be generated using various techniques to restore high frequency details that were lost during the resizing of the image. In some embodiments, the high frequency data may be generated based on a difference in pixel data between a current high resolution estimate (or the resized image) and the original image (or a previous version of the resized image). The high frequency data may subsequently be adjusted to improve the quality (e.g., the signal to noise ratio (SNR)) of the image, for example, by removing or suppressing noise introduced by injecting the generated high frequency data while retaining the components of the injected high frequency data that are consistent among mutually similar patches of the image. To adjust the high frequency data, a collaborative filtering process may be performed. As further described herein, a collaborative filtering process according to embodiments of the disclosure comprises jointly filtering each reference block together with its corresponding matching blocks as a group to exploit correlations among the blocks in the group, so that components of the high frequency data that are consistent in the group are retained while components of the high frequency data that may represent noise may be removed or suppressed.

The resized image may be divided into multiple reference blocks, where each reference block includes a group of adjacent pixels of the resized image. In some embodiments, the reference blocks are distinct, non-overlapping pixel blocks of the resized image. For each reference block, several matching blocks (also referred to as "patches") that meet a mutual similarity condition with respect to the reference block are identified and extracted. A matching block is a group of adjacent pixels within the resized image that has the same size and shape as the reference block. In some embodiments, at least some of the matching blocks may be partially overlapped with each other.

The matching blocks for a reference block may be identified using various techniques. In some embodiments, an incremental search approach is adopted where initially a small local search area of the resized image that is in vicinity of the reference block is searched. Under this incremental approach, if the number of matching blocks found in the local search area has reached a predetermined threshold, the search is completed. However, if the number of matching blocks found within the search area has not reached the predetermined threshold, the search area may be expanded to include additional area of the resized image to search. The search area may continually be expanded and searched until the number of expansion has reached a certain predetermined search iteration threshold, or the number of matching blocks found has reached the predetermined threshold. This way, it is ensured that at least a fixed number of matching blocks will be used for each reference block to adjust the high frequency data.

According to some embodiments, the reference blocks and their respective plurality of matching blocks are initially identified with respect to the original (input) image or the resized image, prior to iteratively injecting and adjusting the high frequency data. In such embodiments, matching blocks are extracted from the high frequency data-injected image during each iteration based on the locations of the matching blocks initially identified prior to the iterations. In some embodiments, the identification of matching blocks may be performed on high resolution estimates (i.e., intermediate results of the resized image with enhanced resolution) of the original image every N iteration of the injecting and the adjusting of the high frequency data.

In some embodiments, two or more stages of the collaborative filtering process are performed using a different reference block size for each stage. Thus, according to one specific implementation example, a two-stage collaborative filtering process may be performed, where the first stage of the collaborative filtering process is performed using first groups of reference blocks and their corresponding plurality of matching blocks extracted according to the block matching performed initially (e.g., prior to the iterations of the injecting and the adjusting) with a first block size, and where the second stage is performed using second groups of reference blocks and their corresponding plurality of matching blocks extracted according to the block matching performed on the high resolution estimates every N iteration (e.g., every 5 iteration as determined through experiments carried out in connection with the disclosure) with a second block size smaller (e.g., finer grain) than the first block size.

Once the matching blocks are identified and extracted, correlations among the matching blocks and the reference block may be used to identify and suppress noise in the high frequency data, for example, by the collaborative filtering process. Embodiments of the disclosure may thus remove noise that was introduced by iterative injection of generated high frequency data, by the system that captures the image (e.g., part of the circuitry or sensor for capturing image data of the scene), or both. The collaborative filtering process according to embodiments of the disclosure may be implemented by modifying the techniques discussed in the article published by one of the inventors of the disclosure and entitled "Image Denoising by Sparse 3D Transform-Domain Collaborative Filtering" in IEEE Transactions on Image Processing, Vol. 16, No. 8, August 2007, which is incorporated herein by reference in its entirety.

The process of injection of high frequency data and adjustment of the high frequency data may be iteratively performed until either a pre-determined number of iterations are completed or a desired quality of super resolution image is achieved.

Turning now to FIG. 1, a block diagram is illustrated of a system 100 for capturing and processing images and videos (e.g., video frames) in accordance with an embodiment of the disclosure. System 100 comprises, according to one implementation, a processing component 110, a memory component 120, an imaging sensor 130, a video interface component 134, a control component 140, a display component 150, a sensing component 160, and/or a network interface 180.

System 100 may represent an imaging device, such as a video and/or still camera, to capture and process images and/or videos of a scene 170. In this regard, the imaging sensor 130 of system 100 may be configured to capture images (e.g., still and/or video images) of scene 170 in a particular spectrum or modality. For example, in some embodiments, the imaging sensor 130 may include a complementary metal oxide semiconductor (CMOS) sensor or a charge-coupled device (CCD sensor that can be found in any consumer camera. In some other embodiments, the imaging sensor 130 may include an IR imaging sensor configured to detect IR radiation in the near, middle, and/or far IR spectrum and provide IR images (e.g., IR image data or signal) representative of the IR radiation from scene 170. In one specific, not-limiting example, the imaging sensor 130 may comprise a long-wave IR (LWIR) (e.g., a thermal IR) imaging sensor having a focal plane array (FPA) of detectors responsive to thermal IR radiation including LWIR radiation.

Other imaging sensors that may be embodied in the imaging sensor 130 include a PMD imaging sensor or other ToF imaging sensor, LIDAR imaging device, millimeter imaging device, PET scanner, SPECT scanner, ultrasonic imaging device, or other imaging devices operating in particular modalities and/or spectra. It is noted that for some of these imaging sensors that are configured to capture images in particular modalities and/or spectra, it is expensive or difficult to produce high resolution, high definition, and/or high SNR output images, for example, when compared with a typical CMOS-based or CCD-based imaging sensors or other imaging sensors, imaging scanners, or imaging devices of different modalities.

The images, or the digital image data corresponding to the images, provided by the imaging sensor 130 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images which are natively of lower resolution, such as those captured by the imaging sensor 130, will typically have a smaller image dimension than higher resolution images, such as those generated by system 100 after performing the resolution enhancing processes described herein on the image of lower resolution. Although natively low resolution images may be upscaled or upsampled to have a larger image dimension, it may be understood that upscaling or upsampling, without more, does not increase the native resolution or the definition (e.g., the image details) of the low resolution images.

In some embodiments, image data captured and/or processed by system 100 may comprise non-uniform data (e.g., real image data that is not from a shutter or black body) of the scene 170, for processing, as set forth herein. System 100 may comprise a portable device and may be incorporated, for example, into a vehicle (e.g., an automobile or other type of land-based vehicle, an unmanned aerial vehicle (UAV), unmanned aircraft system (UAS), drone, or other type of aircraft or spacecraft) or a non-mobile installation requiring images to be stored and/or displayed.

Processing component 110, according to various embodiments, comprises one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure. For example, processing component 110 may include a super-resolution module 112, which may represent any suitable combination of hardware components and software instructions, configured to perform various operations to enhance the resolution of images as further discussed herein. Processing component 110 is configured to interface and communicate with various other components of system 100 to perform such operations. In one aspect, processing component 110 according to some embodiments may be configured to perform various system control operations (e.g., to control communications and operations of various components of system 100) and other image processing operations (e.g., data conversion, video analytics, noise suppression), as part of or separate from the operations to enhance the resolution of images.

It should be appreciated that super-resolution module 112 may, in some embodiments, be integrated in software and/or hardware as part of processing component 110, with code (e.g., software instructions and/or configuration data) for super-resolution module 112 stored, for example, in memory component 120. In some embodiments, a separate machine-readable medium 121 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations disclosed herein. In one aspect, machine-readable medium 121 may be portable and/or located separate from system 100, with the stored software instructions and/or data provided to system 100 by coupling the computer-readable medium to system 100 and/or by system 100 downloading (e.g., via a wired link and/or a wireless link) from computer-readable medium 121.

Memory component 120 comprises, in one embodiment, one or more memory devices configured to store data and information, including video image data and information. Memory component 120 may comprise one or more various types of memory devices including volatile and non-volatile memory devices, such as RAM (Random Access Memory), ROM (Read-Only Memory), EEPROM (Electrically-Erasable Read-Only Memory), flash memory, hard disk drive, and/or other types of memory. As discussed above, processing component 110 may be configured to execute software instructions stored in memory component 120 so as to perform method and process steps and/or operations described herein. Processing component 110 and/or image interface 134 may be configured to store in memory component 120 images or digital image data captured by the imaging sensor 130. Processing component 110 may be configured to store processed (e.g., super-resolved, as discussed herein) still and/or video images in memory component 120.

Image interface 134 may include, in some embodiments, appropriate input ports, connectors, switches, and/or circuitry configured to interface with external devices (e.g., a remote device 182 and/or other devices) to receive images (e.g., digital image data) generated by or otherwise stored at the external devices. The received images or image data may be provided to processing component 110. In this regard, the received images or image data may be converted into signals or data suitable for processing by processing component 110. For example, in one embodiment, image interface 134 may be configured to receive analog video data and convert it into suitable digital data to be provided to processing component 110.

In some embodiment, image interface 134 may comprise various standard video ports, which may be connected to a video player, a video camera, or other devices capable of generating standard video signals, and may convert the received video signals into digital video/image data suitable for processing by processing component 110. In some embodiments, image interface 134 may also be configured to interface with and receive images (e.g., image data) from the imaging sensor 130. In other embodiments, the imaging sensor 130 may interface directly with processing component 110.

Control component 140 comprises, in one embodiment, a user input and/or interface device, such as a rotatable knob (e.g., potentiometer), push buttons, slide bar, keyboard, and/or other devices, that is adapted to generate a user input control signal. Processing component 110 may be configured to sense control input signals from a user via control component 140 and respond to any sensed control input signals received therefrom. Processing component 110 may be configured to interpret such a control input signal as a value, as generally understood by one skilled in the art. In one embodiment, control component 140 may comprise a control unit (e.g., a wired or wireless handheld control unit) having push buttons adapted to interface with a user and receive user input control values. In one implementation, the push buttons of the control unit may be used to control various functions of system 100, such as autofocus, menu enable and selection, field of view, brightness, contrast, noise filtering, image enhancement, and/or various other features of an imaging system or camera.

Display component 150 comprises, in one embodiment, an image display device (e.g., a liquid crystal display (LCD)) or various other types of generally known video displays or monitors. Processing component 110 may be configured to display image data and information on display component 150. Processing component 110 may be configured to retrieve image data and information from memory component 120 and display any retrieved image data and information on display component 150. Display component 150 may comprise display circuitry, which may be utilized by the processing component 110 to display image data and information. Display component 150 may be adapted to receive image data and information directly from the imaging sensor 130, processing component 110, and/or video interface component 134, or the image data and information may be transferred from memory component 120 via processing component 110.

Sensing component 160 comprises, in one embodiment, one or more sensors of various types, depending on the application or implementation requirements, as would be understood by one skilled in the art. Sensors of sensing component 160 provide data and/or information to at least processing component 110. In one aspect, processing component 110 may be configured to communicate with sensing component 160. In various implementations, sensing component 160 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. Sensing component 160 may represent conventional sensors as generally known by one skilled in the art for monitoring various conditions (e.g., environmental conditions) that may have an effect (e.g., on the image appearance) on the image data provided by imaging sensor 130.

In some implementations, sensing component 160 (e.g., one or more of sensors) may comprise devices that relay information to processing component 110 via wired and/or wireless communication. For example, sensing component 160 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, processing component 110 can use the information (e.g., sensing data) retrieved from sensing component 160 to modify a configuration of imaging sensor 130 (e.g., adjusting a light sensitivity level, adjusting a direction or angle of the imaging sensor 130, adjusting an aperture, etc.).

In various embodiments, various components of system 100 may be combined and/or implemented or not, as desired or depending on the application or requirements. In one example, processing component 110 may be combined with memory component 120, the imaging sensor 130, video interface component 134, display component 150, network interface 180, and/or sensing component 160. In another example, processing component 110 may be combined with the imaging sensor 130, such that certain functions of processing component 110 are performed by circuitry (e.g., a processor, a microprocessor, a logic device, a microcontroller, etc.) within the imaging sensor 130.

Furthermore, in some embodiments, various components of system 100 may be distributed and in communication with one another over a network 190. In this regard, system 100 may include network interface 180 configured to facilitate wired and/or wireless communication among various components of system 100 over network. In such embodiments, components may also be replicated if desired for particular applications of system 100. That is, components configured for same or similar operations may be distributed over a network. Further, all or part of any one of the various components may be implemented using appropriate components of a remote device 182 (e.g., a conventional digital video recorder (DVR), a computer configured for image processing, and/or other device) in communication with various components of system 100 via network interface 180 over network 190, if desired. Thus, for example, all or part of processor 110, all or part of memory component 120, and/or all of part of display component 150 may be implemented or replicated at remote device 182, and configured to perform resolution enhancement of images as further described herein. In some embodiments, system 100 may not comprise imaging sensors (e.g., imaging sensor 130), but instead receive images or image data from imaging sensors located separately and remotely from processing component 110 and/or other components of system 100. It will be appreciated that many other combinations of distributed implementations of system 100 are possible, without departing from the scope and spirit of the disclosure.

Turning a low resolution input image into a high resolution image is a classical problem in computer vision and finds numerous applications in medical imaging, security, surveillance and astronomical imaging. Simple methods based on bilinear, bicubic interpolation are frequently used because of their computational simplicity, but, they mostly yield poor results. A number of approaches have been proposed based on machine learning which utilize a prior information to estimate the high resolution image.

In the recent years, successful results have been achieved by learning a low resolution (LR) to high resolution (HR) mapping from a large number of natural images using various machine learning techniques. Existing methods for learning the LR-HR mapping include manifold learning, sparse coding, convolutional neural network, and local linear regression. The main advantage of these approaches is that strong prior can be learned and subsequently used to generate high resolution images from the large training data.

However, these methods have certain limitations. They heavily rely on a large amount of training data, which can be very specific for different kind of images. The LR-HR mapping is learned for a specific up-sampling factor, thus, it has strict constraints on the up-sampling factor at the run time. Furthermore, a number of these approaches do not support a non-integral up-sampling factor in their current form.

Certain researchers have addressed the single-image super-resolution (SISR) problem by exploiting the priors from input image in various forms of self-similarity. It has been observed that, although fewer in number, the search that is based solely on the input image results in more relevant patches. Most of self-similarity based algorithms find a LR-HR pair by searching for the most similar target patch in the down-sampled image. These approaches have the advantage of being training free and do not require any external training data, but, their performance is usually inferior to the dictionary based approaches. Recently, superior performance has been reported on the images which exhibit high degree of self-similarity, compared to a number of dictionary based methods.

However, on natural images, their results are still inferior to the dictionary based approaches. These methods infer the HR patch using a single most similar patch from the input image. A single patch, although highly relevant, provides a weaker prior compared to the large number of patches utilized by the external data based approaches.

Thus, the recent SISR algorithm can be broadly divided into two main classes. First, the algorithms that utilize the external images to learn patch prior (known as the external data based approach), and, others, exploiting image self-similarity (known as the self-similarity based approach)

Techniques under the external data based approach use a large set of high resolution patches and their downsampled low resolution versions to learn a coupled LR-HR dictionary. The patches are represented using sparse activation of the dictionary atoms. A number of methods have been used to learn the LR-HR dictionaries. Early approaches were based on neighborhood embedding, however these dictionaries quickly become very large when large data is used. One method utilized coupled sparse representation to learn the dictionaries, which allows a more compact dictionary. Another method utilized an improved image representation for a more robust learning. Some methods reduced the complexity by performing a pre-clustering, so only a subset of the dictionary entries is used for patch inference during the test time. Another method uses convolutional neural network (CNN) to learn complex mapping functions.

These approaches require long duration of training time by the computer. Furthermore, a separate dictionary is trained for each upsampling factor, which limits the values of upsampling factor during the test time.

Techniques under the self-similarity based approach exploit the idea that the natural images are sparse in nature and patches exhibit high degree of repetitive behavior. One method included a super-resolution algorithm by exploiting the self-similarity and the fractal characteristic of the image at different scales. Further, the non-local means is used to perform the weighting of patches. Another method extended the idea by imposing a limit on the search space and, thereby, reduced the complexity. This method also incorporates incremental up-sampling to obtain a desired image size. Another method utilizes the self-similarity to generate an example codebook to estimate the missing high-frequency band. Another method uses self-examples within and across multiple image scales to regularize the otherwise ill-posed classical super-resolution scheme.

However, the majority of methods under the self-similarity based approach utilize one best matching patch candidate to estimate the high frequency. One patch is far less when compared with the huge amount of patches used in dictionary based methods to learn the prior for a patch. Furthermore, the image is downsampled in these approaches to search the best match. The downsampling results in the loss of high frequencies and the best patch is selected based on the low frequencies.

In contrast to these conventional super-resolution techniques and their deficiencies, embodiments of the present disclosure exploit self-similarity more effectively by identifying and using multiple similar patches in images to ensure the consistency of generated (e.g., restored, estimated) high frequency details. It has been shown that patches (blocks within an image) are inherently repetitive in natural images. It is believed that the mutually similar patches in an image lie on a low dimensional manifold.

Therefore, during the super-resolution process, when some high frequency details are introduced into a patch, it should be consistent with the other patches which lie on the same manifold. In one or more embodiments of the present disclosure, iterative back projection is used to introduce the high frequencies and a two-stage collaborative filtering is applied to check the consistency of these frequencies with the self-similar patches, as discussed below for an example implementation.

First, the input image (original image) is upsampled using bicubic interpolation to a desired scale. This coarse upsampling results in a loss of details which are encoded by the high frequencies. Therefore, the rest of the process under this approach focuses on restoration of the high frequency details in the coarsely upsampled image. To restore the high frequencies, an iterative back projection approach is utilized. It computes the missing high frequencies by taking the difference between the input image and the reconstructed image in LR space. The high frequency image is again upsampled to the HR space using bicubic interpolation and added into the reconstructed estimate. However, the back projection also propagates the noise in the reconstructed high resolution image, which is further amplified iteratively. Therefore, a two-stage collaborative filtering is applied to retain only those high frequencies which are consistent with the mutually similar patches. The back projection and the two-stage collaborative filtering are performed iteratively.

The main advantages of the self-similarity based approach (also referred to herein as the iterative collaborative filtering approach) for single image super-resolution disclosed herein in accordance with various embodiments of the disclosure include (1) no external data or training required; (2) superior performance; (3) support of non-integral scaling factors (images can be upscale to any size, without any change in parameters); (4) no border pruning effect, unlike most of the dictionary based algorithms; and (5) robustness to noise.

In other words, as further discussed below, various embodiments of the disclosure may provide the combined benefit of the traditional back projection scheme with the collaborative filtering. As discussed herein, local self-similarity is more efficient than the global self-similarity for application of super-resolution, and the patches extracted from input image can provide strong prior for the super-resolution. Also, the strength of the prior increases as more number of patches are considered from the image.

Thus, for example, various embodiments of the disclosure may advantageously provide super-resolution of images in applications where the data bandwidth is insufficient to provide a video (e.g., continuous image sequence). Furthermore, various embodiments of the disclosure may advantageously provide super-resolution of images in applications in which the original images may natively have a low resolution, low definition, and/or low signal-to-noise ratio (SNR), such as images captured by infrared imaging sensors (e.g., infrared imaging sensors responsive to thermal infrared, near infrared, or infrared radiation in other wavebands), time-of-flight imaging sensors, millimeter wave imaging sensors, LIDAR sensors, or other imaging sensors that operate in modalities and/or spectra that make it difficult to obtain native high resolution images. In this regard, in some implementation examples, various embodiments of the present disclosure may be implemented as part of an unmanned aerial vehicle (UAV), unmanned aircraft system (UAS), drone, or other mobile surveillance platforms that would benefit from image resolution enhancement of natively low-resolution images captured in various different modalities and spectra, but have a limited data bandwidth for a continuous video stream.

Figure 2:
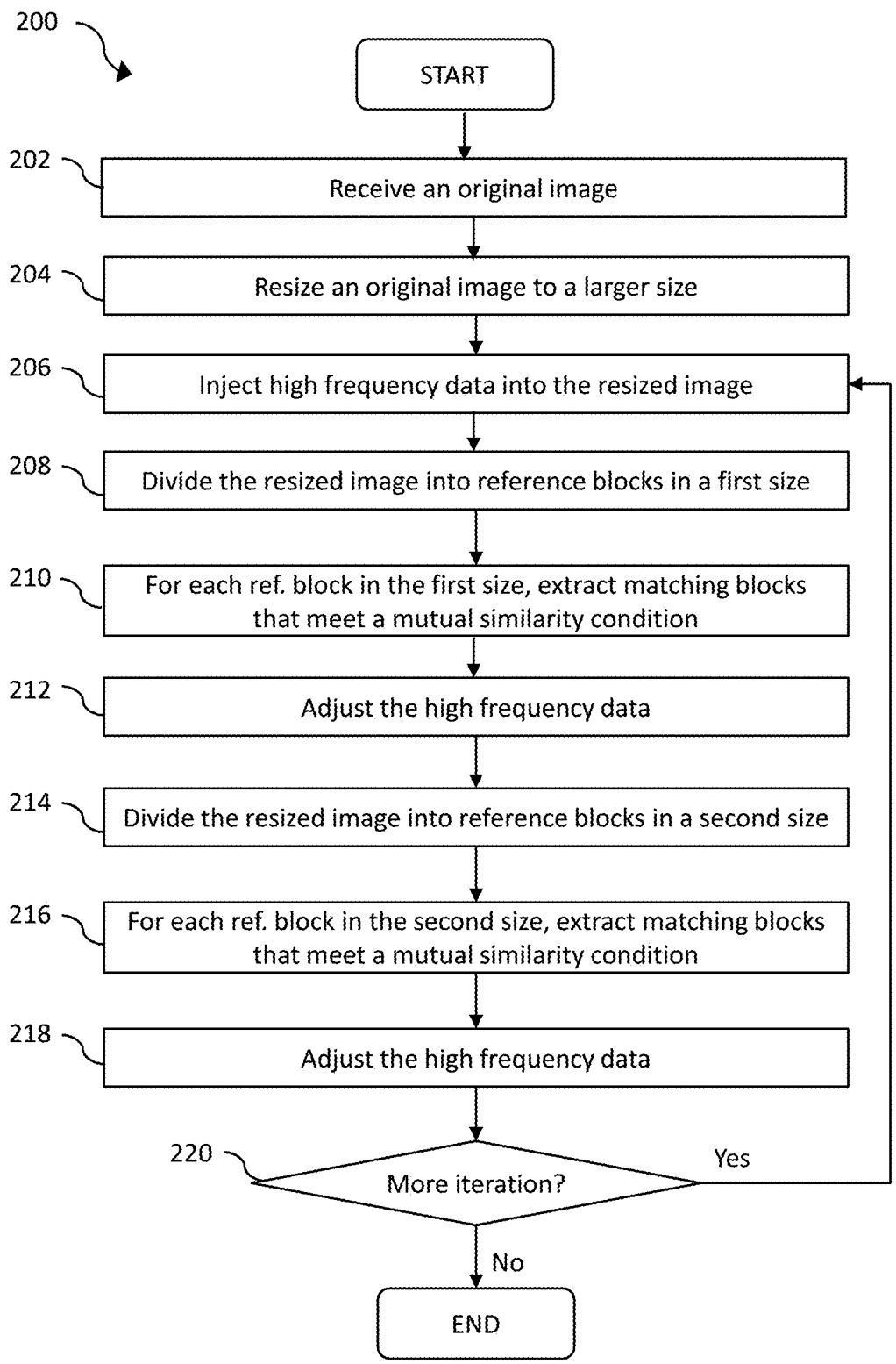
FIG. 2 illustrates a flow diagram of a process to enhance image resolution in accordance with an embodiment of the disclosure.

Turning to FIG. 2, which is a flow diagram of a process 200 to enhance image resolution in accordance with an embodiment of the disclosure. Process 200 may be performed by various components of system 100. However, it should be appreciated that system 100 and various components thereof are identified only for purposes of giving examples, and that any other suitable system may be utilized to perform all or part of process 200. It should also be appreciated that any block, sub-bloc, step, sub-step, or sub-process of process 200 may be combined and/or performed in an order or arrangement different from the embodiment illustrated by FIG. 2.

At step 202, an original image (such as an original image 305 of FIG. 3) is received, for example, at processing component 110 from imaging sensor 130, or from externally captured and/or stored images or videos via image interface 134. Original image 305 is an image comprising digital image data to be super-resolved (e.g., have its resolution, definition, and/or SNR increased). The original image includes several pixels. Each pixel has pixel data that represents a value along a modality or spectrum (e.g., color, luminance, infrared, thermal, etc.) for the pixel. For example, original image 305 may be captured by a CCD or CMOS sensor, an IR imaging sensor, PMD or other ToF imaging sensor, LIDAR imaging device, millimeter wave imaging sensor, or other imaging sensors. In one example, original image 305 may be an IR image captured in a relatively low native resolution such as 80×60, 160×120, 320×240, or other resolution.

At step 204, original image 305 is resized to a larger size (e.g., to have a larger image dimension) to generate a resized image 310. In some embodiments, upscaling (e.g., by bilinear interpolation, by bicubic interpolation, etc.), upsampling, or other linear higher-order, or non-linear interpolation techniques may be performed on original image 305 to resize original image 305 to a larger dimension than its native image dimension. For example, original image 305 may have a native image dimension of 80×60, and resized image 310 may have a larger image dimension of 160×120. In this example, each pixel of the resized image 310 may then be identified by a corresponding pixel coordinate comprising one of 160 positions in the x-axis or width and one of 120 positions in the y-axis or height. It is noted that at this point, even though resized image 310 has a larger image dimension, it may not have more resolution or definition of detail than original image 305. As such, the steps that follow focus on improving and restoring the high frequency details in resized image 310.

Figure 3:
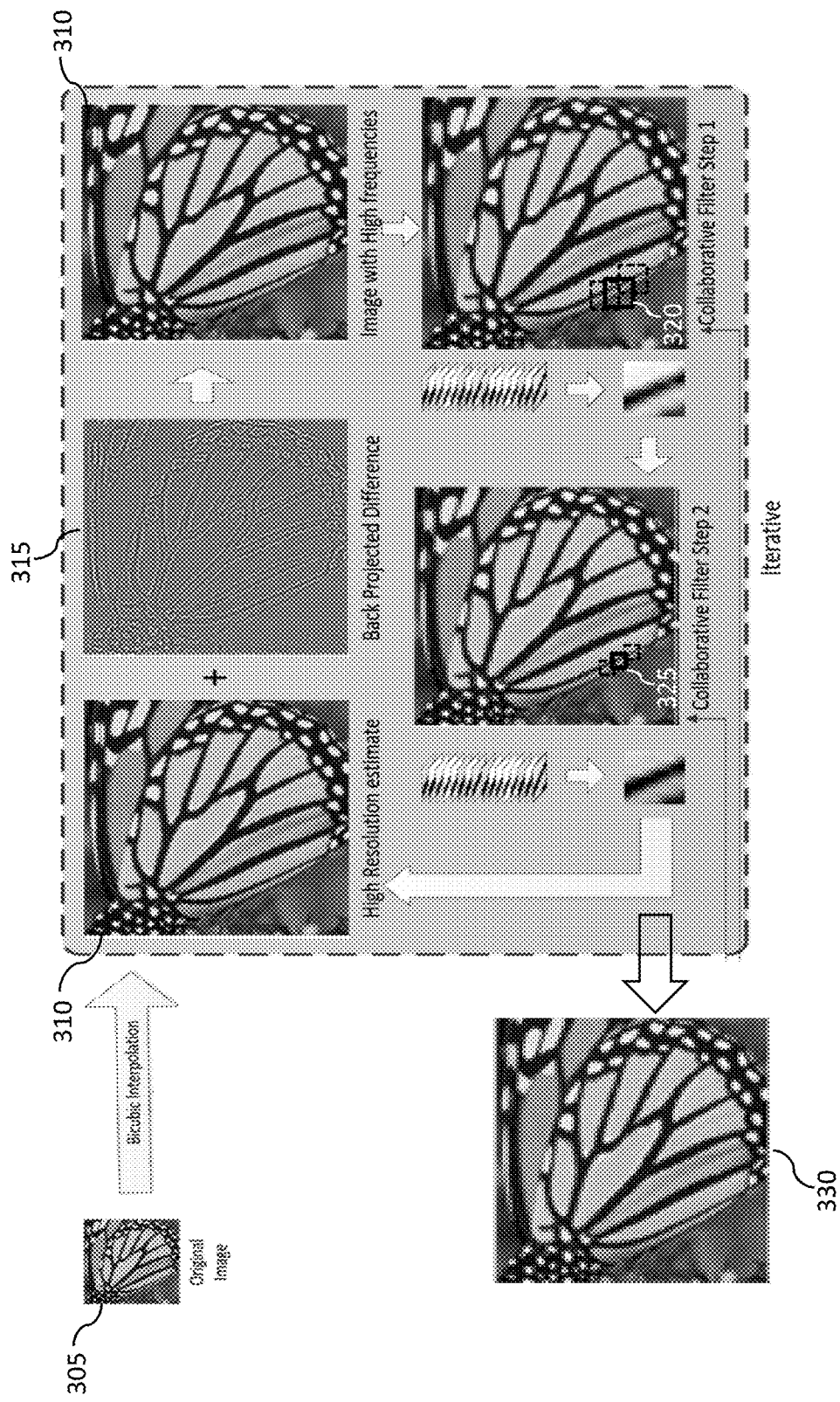
FIG. 3 illustrates iterative collaborative filtering in accordance with various embodiments of the disclosure.

At step 206, high frequency data may be injected into resized image 310. In some embodiments, the high frequency data may be generated or computed using a back projection process, for example, by appropriately modifying the techniques described in the article entitled "Improving Resolution by Image Registration" by M. Irani and S. Peleg, published in CVGIP: Graphical Models and Image Processing, May 1991, which is incorporated herein by reference in its entirety. Thus, an example back projection process implemented according to embodiments of the disclosure takes a difference between a downsampled version of resized image 310 and original image 305, and upsamples the difference to the larger size of resized image 310. FIG. 3 illustrates an image difference 315 generated by in this manner. The difference 315 may be added to resized image 310 to inject high frequency data. It is noted that while injecting the high frequency data increases the resolution of resized image 310, the noise from resized image 310 is also propagated and amplified during this process. Thus, filtering, such as a two-stage collaborative filtering as described herein, may be applied to resized image 310 to retain only the good high frequency data by removing the noise.

Figure 4:
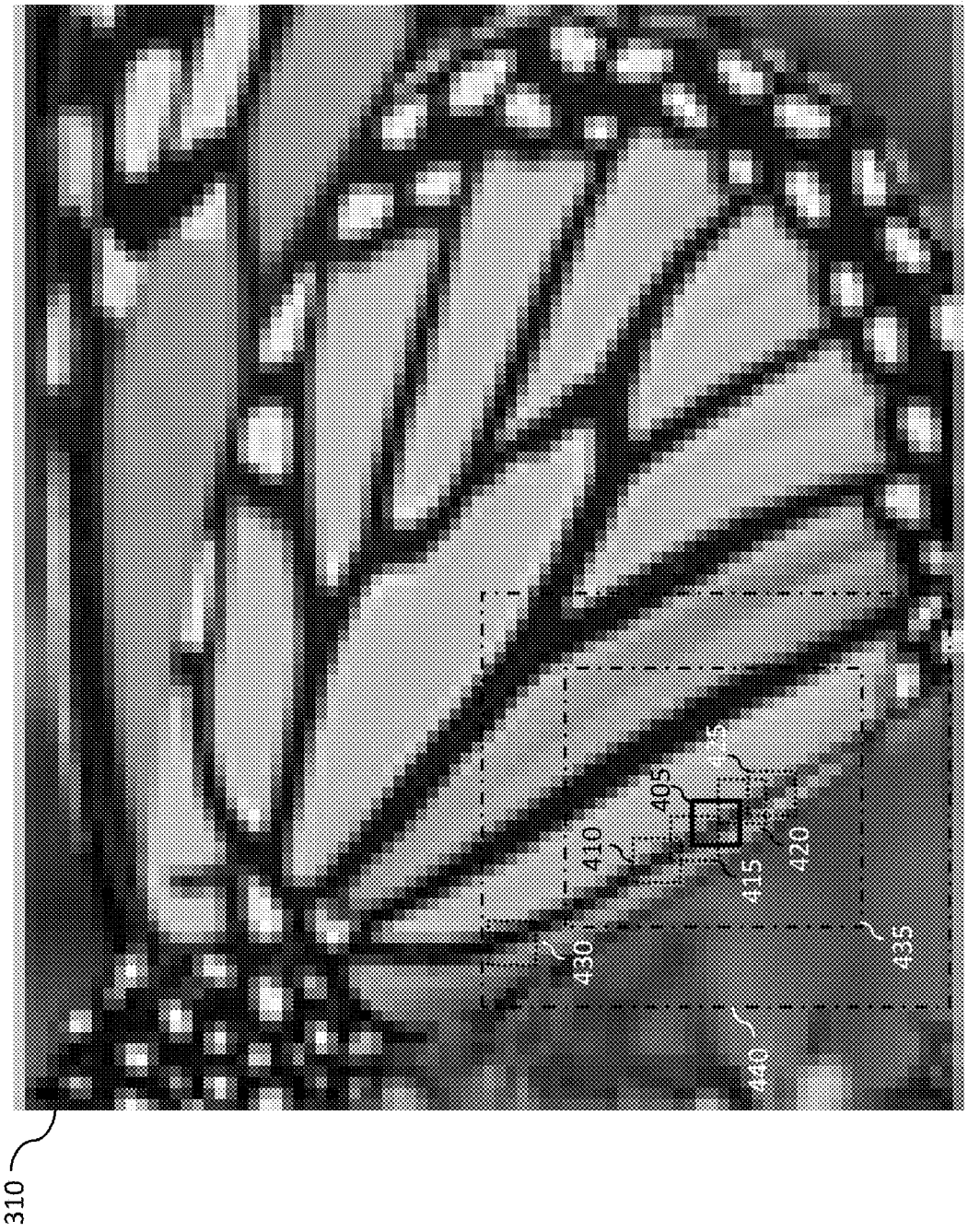
FIG. 4 illustrates searching of matching blocks within an expandable search area in accordance with various embodiments of the disclosure.

In some embodiments, the two-stage collaborative filtering is performed on resized image 310 in a block by block basis. A block is a portion of resized image 310 that includes a group of adjacent (contiguous) pixels (more than one pixel). As such, at step 208, resized image 310 is divided into multiple reference blocks. A block can be of different shapes and sizes. For example, a block can be a rectangle, an ellipse, or any other regular or irregular shapes. Preferably, the reference blocks that are divided within resized image 310 are of the same size. For example, each reference block can be a square having a size of 5×5 pixels. In some embodiments, the reference blocks are non-overlapping (while it has been contemplated that at least some of the reference blocks may be partially overlapping with each other), and collectively they cover the entire resized image 310. FIG. 4 illustrates one example reference block 405 out of many reference blocks for image 310. Reference block 405 in this example is a rectangle in shape, as indicated by the solid border. Although FIG. 4 only shows one reference block 405 on resized image 310, it is noted that resized image 310 may be divided into many reference blocks, including reference block 405, that are of the same shape and size as reference block 405. Each reference block includes image data (or pixel data) that represents pixel values along a modality/spectrum for pixels within the reference block.

As discussed, collaborative filtering may be performed on resized image 310 in a block by block basis. Thus, at step 210, for each reference block (e.g., reference block 405) on resized image 310, multiple matching blocks that satisfy a mutual similarity condition with respect to the reference block may be identified and extracted from resized image 310.

Similar to a reference block, each matching block includes a portion of resized image 310 having contiguous pixels. Preferably, each matching block has the same size and shape as the corresponding reference block. FIG. 4 illustrates several matching blocks 410-430 (indicated by dotted rectangular borders) that have been identified for the corresponding reference block 405 on resized image 310. As shown, at least some of the matching blocks may be partially overlapping with each other (e.g., matching blocks 410 and 415, etc.), and may also be partially overlapping with the corresponding reference block (e.g., matching blocks 415 and 420).

It is noted that the matching blocks are extracted from resized image 310 (the same image that includes the reference block) instead of extracted from a downsampled version of resized image 310. Furthermore, in various embodiments, a predetermined number K that is greater than one (K>1) is used as the size of the matching block set for each reference block in resized image 310. The advantages of having a constant matching block set size greater than one will be explained in more detail below.

To identify the set of matching blocks that satisfy a mutual similarity condition with respect to a corresponding reference block, the following technique may be applied. Let $\Omega$ be the indices of the pixels in the input image (the resized image) I. For a reference block $P(x_r)$ located at position $x_r = (r^X, r^Y)^T$ the goal is to find (identify) a set of similar patches (blocks of pixels) based on the Euclidean distance that may be determined using the following equation:

$$d(P(x_r), P(x_i)) = \frac{\|P(x_r) - P(x_i)\|^2}{N^2} \quad (1)$$

where N is the size of the patch (block).

The set of similar patches for the reference block at $x_r$ is given as $S(x_r)=\{i\in\Theta, d(P(x_r),P(x_i))\leq\tau\}$. The parameter $\Theta \subset \Omega$ defines the search space for the block matching. $\Theta$ is a factor that restricts the search space for the block matching, affects the cardinality of the set of matching blocks, and controls the complexity of the search.

Figure 5:
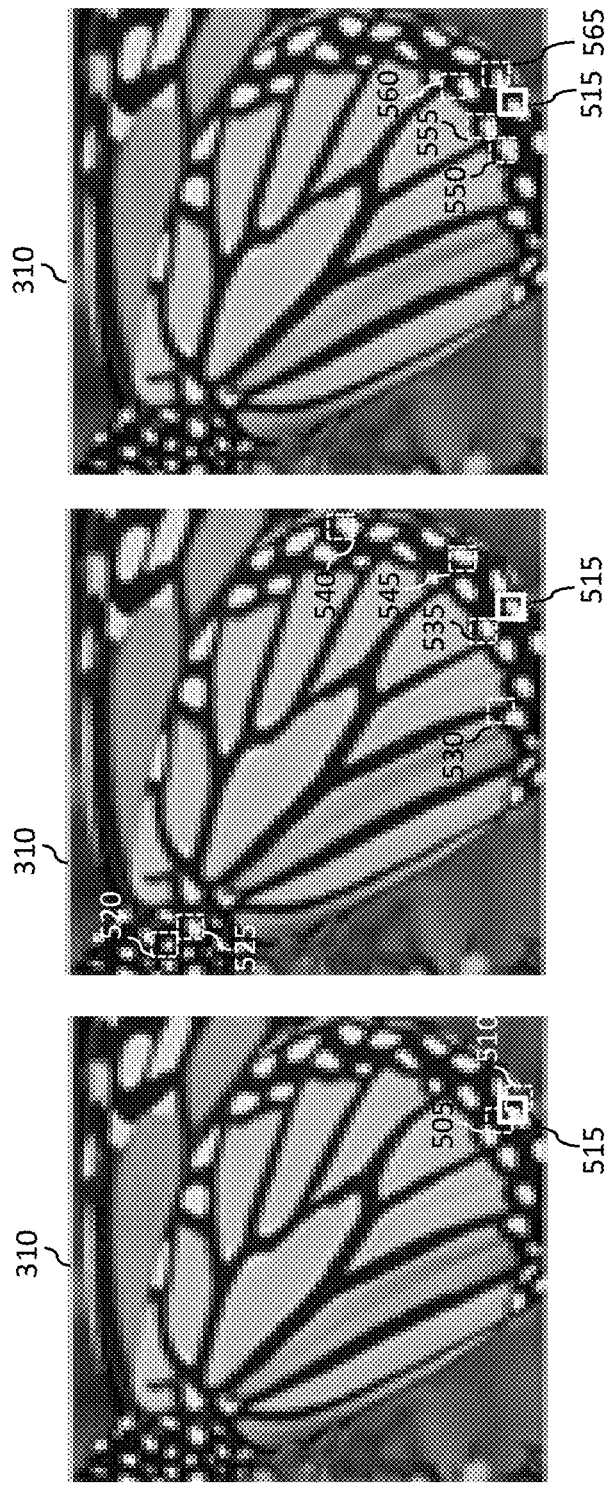
FIG. 5A-5C illustrate a comparison of different results from a global search, a local search, and an incremental search, in accordance with an embodiment of the disclosure.

The search space (search area) parameter $\Theta$ is defined as a set of indices that correspond to the square region of size 2R+1 centered around the location of the reference patch (block) ($x_r$). The objective is to select the a parameter R, such that the cardinality of the set of matching patches (blocks) $|S(x_r)|=K$. If R is set to a fixed value, then we observe that for a number of reference blocks, the set of corresponding matching blocks S may have very low cardinality (e.g., only have 1 or 2 corresponding matching blocks for those reference blocks), because for example, the similar patches (blocks) are located outside the radius R within resized image 310. FIG. 4 illustrates a matching block 430 for reference block 405 that is located outside of a search area 435, and the matching block 430 will not be included in the matching block set for reference block 405 if the search area is limited to search area 435. FIG. 5A also illustrates when R is set to a fixed, low value, the number of matching blocks (matching blocks 505 and 510, indicated by thin dotted rectangular border) identified for reference block 515 (indicated by thick solid rectangular border) in resized image 310 is very small.

One approach to ensure the cardinality of the matching block set for any given reference block $|S(x_r)|=K$ is to use a large value of R. For a sufficiently large value R, the search space spans the entire image, and, all the patches (blocks) mutually similar to the reference block are selected. This is the case of global self-similarity. However this approach has two drawbacks. First, it significantly increases computational overhead as the complexity grows quadratically with R. Second, it results in the inclusion of certain patches (matching blocks) which are close to the reference patch (block) in Euclidean space, but, represent a very different structure in the image. It is speculated that, these patches do not lie on the same low dimensional manifold as the reference patch (block).

FIG. 5B illustrates several matching blocks 520-545 (indicated by dotted rectangular border) that were identified for reference block 515 (indicated by thick solid rectangular border) in resized image 310 under the global self-similarity approach. It can be observed that for reference patch (block) 515, the global self-similarity results in selection of the matching patches (blocks) (e.g., matching blocks 520 and 545) that are located on the top left corner of resized image 310, which have very different surrounding structure compared to reference patch (block) 515. The sparse structure of these matching patches (blocks) is not consistent with reference patch (block) 515.

To achieve the cardinality $|S(x_r)|=K$ (that is, to have the number of matching blocks identified to reach the predetermined number K), where K is a predetermined number that is sufficiently large and greater than one, it is contemplated that an incremental search approach may be adopted. Under this incremental search approach, an initial fixed value R is determined at the beginning of the search. The initial fixed value R defines an initial local search area. Referring back to FIG. 4 with reference to resized image 310, the initial fixed value R may define a local search area 435. A search is performed within search area 435 to identify matching blocks that satisfy the mutual similarity condition with respect to reference block 450 (e.g., mutually similar to reference block 450). In this example, only matching blocks 410-425 are identified within search area 435. If the number of matching blocks found within search area 435 does not reach the predetermined threshold (i.e., $|S(x_r)|<K$), the search area is expanded by increasing the value R. In some embodiments, every time a search area is needed to be expanded, the value R is increased by a fixed value $\Delta R$. For example, the value $\Delta R$ can be set to 10 pixels. For example, search area 435 can be expanded to become expanded search area 440, and another search is performed in the expanded search area 440 to identify matching blocks for reference block 405. In this example, an additional matching block 430 is identified from the expanded search area 440.

In some embodiments, the number of times that the search area is expanded can be limited (e.g., limited to a maximum of 5 iterations, etc.). In other embodiments, the search area can be expanded until either the number of matching blocks has reached the predetermined threshold K, or the search area becomes the entire resized image. The incremental strategy is computationally efficient as the search space is adaptively increased. Further, it enforces the locality constraint, as it does under the local search approach. FIG. 5C illustrates the matching blocks 550-565 (indicated by dotted rectangular border) that were identified for reference block 515 (indicated by thick solid rectangular border) in resized image 310 under the incremental search approach.

Table 1 below illustrates the various performances (measured in SNR) recorded for a set of images (Set5) when global search, local search, and incremental search were adopted, respectively, to identify matching blocks. As shown, the performance drops considerably with a global search, and the incremental search approach yields the best performance among the three approaches.

TABLE 1

Effect of different search strategies on super-resolution performance.

| Search strategy | Global | Local | Incremental |
| --- | --- | --- | --- |
| Set5 (db) | 30.78 | 31.18 | 31.26 |

Once the set of matching blocks are identified for a reference block, the image values (e.g., pixel values) of the set of matching blocks are extracted and used to adjust (at step 212) the high frequency data previously injected into the reference block and the corresponding matching blocks. Correlations among the set of matching blocks and the corresponding reference block are identified in order to determine which portion of the high frequency data injected into the reference block and the corresponding matching blocks is useful, and which portion of the high frequency data is noise. The high frequency data of the reference block and the corresponding matching blocks is jointly (e.g., collaboratively) adjusted to remove the noise portion while retaining the useful portion.

In one aspect of the various embodiments, collaborative filtering may be applied to the reference blocks and their corresponding plurality of matching blocks based on the techniques disclosed in the article "Image Denoising by Sparse 3D Transform-Domain Collaborative Filtering" reference herein above and modified according to the embodiments of the disclosure. Collaborative Filtering is a technique to process the groups of mutually similar patches (the set of matching blocks and the corresponding reference block) simultaneously by exploiting the correlation between them. First, the matching blocks and the corresponding reference block are arranged in a three-dimensional (3D) array of pixels (for example, by aligning or stacking the matching blocks and the corresponding reference block on top of each other). The filtering (at step 212) is performed on the 3D stack of pixels for each reference block, thereby jointly and collaboratively filtering each reference block together with its corresponding matching blocks.

In some embodiments, such joint filtering may be performed through transform domain shrinkage. Thus, the filtering (at step 212) may comprise performing a 3D transform on each 3D stack to obtain a corresponding 3D transform domain representation (which may also be referred to as a 3D spectrum). For example, the 3D transform may be performed by a separable composition of a 2D transform followed by a 1D transform or a 1D transform followed by a 2D transform, using various types of transforms (e.g., discrete cosine transform (DCT), discrete sine transform (DST), discrete wavelet transform (DWT), discrete Fourier transform (DFT), Haar transform, identify transform, or any combination thereof). The filtering (at step 212) then involves modifying (e.g., shrinking) the coefficients of the 3D spectra. For example, the shrinking of the coefficients may include thresholding (e.g., hard thresholding, soft thresholding, or others), scaling, Wiener filtering, or other operations suitable for regularizing signals in a transform domain. It is also contemplated that other forms of regularization such as weighted averaging or diffusion may be performed in place of or in addition to the transform at step 212.

After the shrinking of the coefficients is performed in the 3D transform domain, an inverse of the 3D transform is performed to obtain filtered 3D stacks each comprising a filtered reference block and filtered matching blocks. These filtered reference blocks and filtered matching blocks each represent a local high resolution estimate for the corresponding block location, and are aggregated at step 212 to generate a global high resolution estimate. As discussed below, the generated global high resolution estimate may serve as resized image 310 for the next iteration of steps 206 through 220 if performed, a final result of process 200 if no more iteration is performed, or a first-stage estimate if more than one stage of collaborative filtering is performed according to some embodiments.

In some embodiments, additional stages of collaborative filtering can be applied to further improve the quality of the resulting high resolution image. Referring back to FIG. 3, resized image 310, after having high frequency data injected, undergoes a first collaborative filtering stage where a set of matching blocks are identified for each reference block, and a first-stage estimate is obtained after transform domain shrinkage is applied to the stack of 3D pixel array and aggregated back as discussed above. After the first collaborative filtering is completed, a second stage of collaborative filtering may be performed on the first-stage estimate using a difference size of the reference blocks than the first stage. In some embodiments, the reference block size used in the second collaborative filtering stage is smaller than the block size used in the first collaborative filtering. In this regard, as part of the second collaborative filtering, at step 214 of the image enhancing process 200, the first-stage estimate is again divided into multiple reference blocks in a manner similar to step 208. The difference from step 208 is that the divided reference blocks under step 214 has a different size (e.g., smaller than) than the reference blocks divided under step 208. As shown in FIG. 3, the example reference block 325 (indicated by a solid rectangular border) in the second collaborative step is smaller than the example reference block 320. Again, for each reference block, a set of matching blocks that meet a mutual similarity condition with respect to the reference block is identified and extracted at step 216 in the same way as described above by reference to step 210. Since the reference blocks are smaller, the matching block size is proportionally smaller as well to match the size of the reference blocks.

Figure 6:
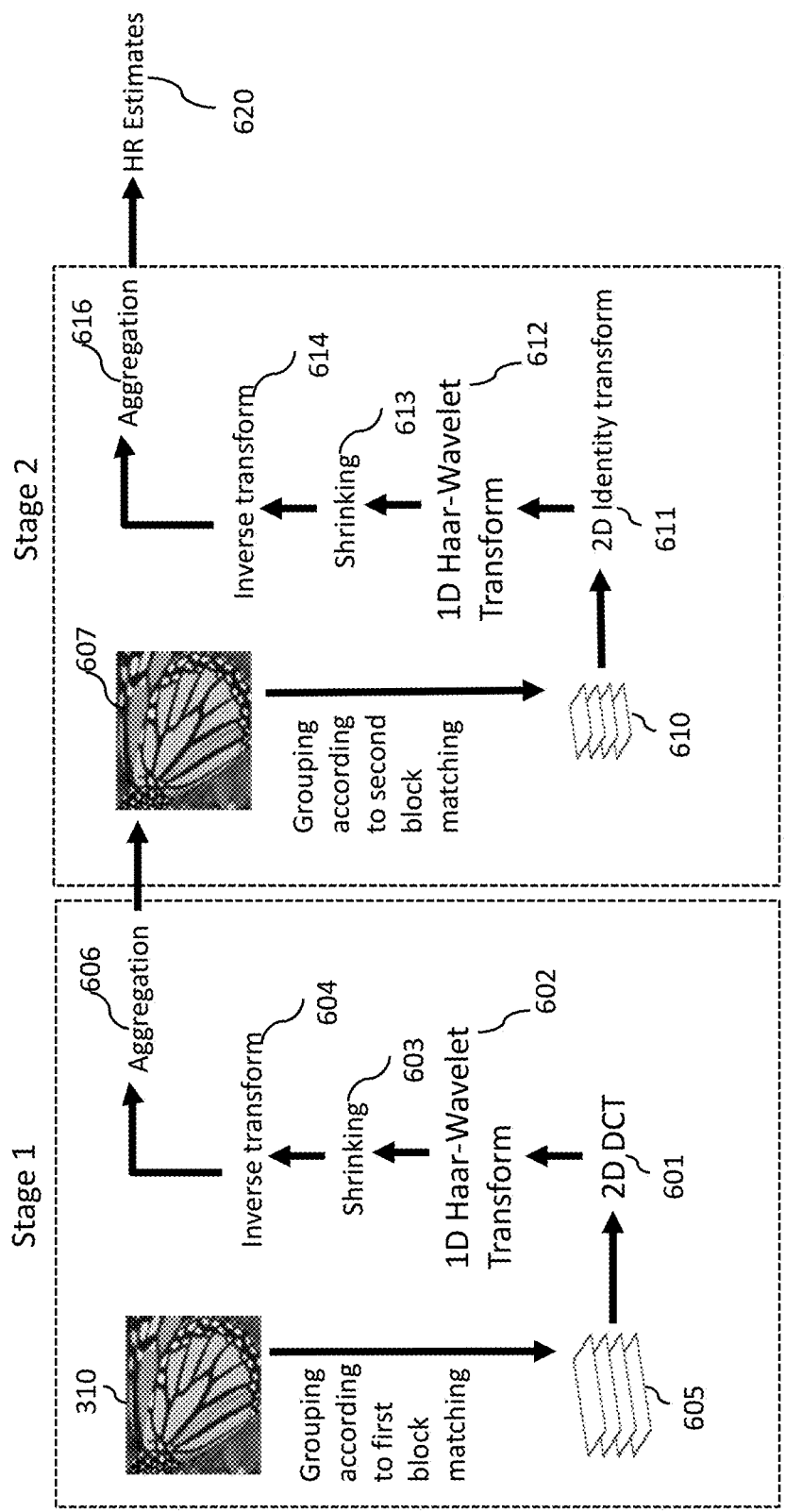
FIG. 6 illustrates a two-stage collaborative filtering process in accordance with an embodiment of the disclosure.

FIG. 6 illustrates a multi-stage (e.g., a two-stage) collaborative filtering process in more detail, in accordance with an embodiment of the disclosure. As shown in FIG. 6, a stack of 3D pixel array 605 is generated for each reference block from resized image 310. In this example, during the first collaborative filtering stage, a two-dimensional (2D) discrete cosine transform (DCT) 601 along with a one-dimensional (1D) Haar transform 602 are applied to the stack 605. The 2D DCT 601 transform may be applied to pixel values along two of the three dimensions (e.g., the length dimension and the height dimension) of stack 605, while the 1D Haar transform 602 is applied to pixel values along the third dimension (e.g., the height dimension) of stack 605. Shrinking 603 is performed on the transformed 3D stacks (3D spectra) and the inverse 604 of the transforms 601 and 602 is applied to obtain filtered 3D stacks, which are aggregated 606 to generate a first-stage estimate 607.

In the second collaborative filtering stage, each reference block that is smaller in size than in the first stage and corresponding matching blocks are extracted from first-stage estimate 607 to form a stack of 3D pixel array 610. As shown, the 3D stack 610 may have different length and width due to the smaller size of the blocks, but may have the same height as 3D stack 605. Collaborative filtering is performed on first-stage estimate 607 to adjust the high frequency data (at step 218). It has been contemplated that different transformations can be used in step 218 compared to the transformations used in step 212. In this example shown in FIG. 6, a 2D Identity transform 611 along with a 1D Haar transform 612 are applied to stack 610. The 2D Identity transform 611 may be applied to pixel values along two of the three dimensions (e.g., the length dimension and the height dimension) of stack 610, while the 1D Haar transform 612 is applied to pixel values along the third dimension (e.g., the height dimension) of stack 610. Shrinking 613 is performed on the transformed 3D stacks (3D spectra) and the inverse 614 of the transforms 601 and 602 is applied to obtain filtered 3D stacks, which are aggregated 616 to generate a high resolution estimate 620.

High resolution estimate 620 can be used as a final high resolution product (e.g., the resulting image 330 in FIG. 3, for display via display component 150 or for other analysis by system 100 or other computing systems external to system 100) or as a current high resolution estimate (e.g., resized image 310) for successive iterations of the injection and the adjusting of high frequency data. In this regard, the injection of high frequency data and the two-stage collaborative filtering can be performed iteratively, according to one or more embodiments.

As shown in FIG. 3, the steps of injecting additional high frequency data and collaborative filtering can be performed again on high resolution estimate 620 used as resized image 310. Thus, at step 220, the process 220 determines whether an additional iteration is needed. If it is determined that no more iteration is necessary, the process 200 ends and outputs high resolution estimate 620 as the resulting image 330. On the other hand, if it is determined that an additional iteration is needed, the process 200 reverts back to step 206 and repeats steps 206 through 220. For example, new high frequency data is injected to resized image 310 that was modified by the previous iteration(s) of high frequency injection and the two-stage collaborative filtering. As discussed above, high frequency data can be generated based on a difference in pixel data between the resized image and the original image. In some embodiments however, after the initial iteration, the high frequency data may be generated based on a difference in pixel data between a current version of the resized image and a previous version of the resized image (the previous version being the resized image before the resized image has undergone the previous collaborative filtering). After the new high frequency data is injected, the resized image would undergo the same two-stage collaborative filtering as discussed above, and the process 200 would again determine whether an additional iteration is needed at step 220.

According to some embodiments, the identifying of matching blocks discussed above for step 210 may be performed once with respect to resized image 310 or original image 305 initially, but not repeated in subsequent iterations of steps 206 through 220 of process 200. Thus, in such embodiments, the computational complexity to identify matching blocks for each reference block of the first size may be reduced significantly. According to some embodiments, the identifying of matching blocks discussed above for step 216 may be performed only every N iteration (e.g., every 5 iteration as determined through experiments carried out in connection with the disclosure) of steps 206 through 220 of process 200. Thus, in such embodiments, the identifying of matching blocks for each reference block of the second size may adapt to the high frequency detail revealed after every N iteration without significantly increasing the overall computational complexity. In some embodiments, a fixed number of iterations for performing the high frequency data injection and two-stage collaborative filtering can be pre-determined, either by a user through control component 140 or by processing component 110 based on an analysis of original image 305. In other embodiments where a certain result is desired, processing component 110 may analyze resized image 310 after each cycle and determine whether an additional iteration of high frequency injection and two-stage collaborating filtering is needed.

Experiments

As discussed above, the iterative collaborative filtering and incremental search for matching blocks advantageously implemented according to embodiments of the disclosure produce higher quality resolution-enhanced images than other conventional methods. Experiments have been conducted to support this finding. Specifically, process 200 according to various embodiments of the disclosure (also referred to herein as "the ICF approach") was tested against several conventional approaches on three different image sets and three upscaling factors. First, details of the data sets (image sets), comparative methods, and algorithm implementation will be explained. Next, several parameters of the ICF are studied in details and their effect on the performance is analyzed. Then, a performance of the ICF approach is compared with alternative approaches. Finally, the visual quality of results obtained by various approaches is discussed.

Experimental Setup: The ICF approach was tested using two publicly available datasets, which will be referred to as Set5 (available from M. Bevilacqua, A. Roumy, C. Guillemot, and M. L. Alberi-Morel. Low-complexity single-image super-resolution based on nonnegative neighbor embedding. 2012) and Set14 (available from R. Zeyde, M. Elad, and M. Protter. On single image scale-up using sparse-representations. In Curves and Surfaces, pages 711-730. Springer, 2012). Set5 and Set14 contain 5 and 14 images, respectively. These two datasets have been extensively used by researchers to test super-resolution algorithms, and contain limited number of images and usually of objects and people. For a more thorough analysis, the ICF algorithm is also tested on the Urban 100 Dataset (available from J.-B. Huang, A. Singh, and N. Ahuja. Single image super-resolution from transformed self-exemplars. In IEEE Conference on Computer Vision and Pattern Recognition), 2015), which contains 100 images. Urban 100 Dataset contain images of buildings and real world structures.

Comparative Methods: The publicly made available framework by Timofte et. al. (R. Timofte, V. De Smet, and L. Van Gool. A+: Adjusted anchored neighborhood regression for fast super-resolution. In Computer Vision—ACCV 2014, pages 111-126. Springer, 2014.) were used to compare the ICF approach with several alternative dictionary based algorithms and self-similarity based algorithms.

Implementation details: Block size is an important factor involved in the ICF approach. In the conducted experiments, the block size is set based on the upsampling factor, $N_1$=max (8, 4×(s−1)) for the first stage of collaborative filtering, where s is the upsampling factor. For the second stage of the collaborative filtering, the block size is fixed as $N_1$=0.5*$N_1$. The value of R is set to 12 for both the stages. The threshold parameter for the collaborative filtering is quadratically decreased from 24×s to s with each iteration. The values of the threshold t for the block matching is kept the same. It is observed, that the performance is stable to the variations in the values of τ. The maximum number of iterations for back projection and the stack size are varied and determined based on the experiments. Once fixed, these parameters are kept constant for all the experiments and all scaling factors.

The ICF approach is applied only on the luminance component and bicubic interpolation is used for the other components. For a fair comparison with other approaches, the border of the high resolution images obtained by the ICF approach is cropped.

Figure 7:
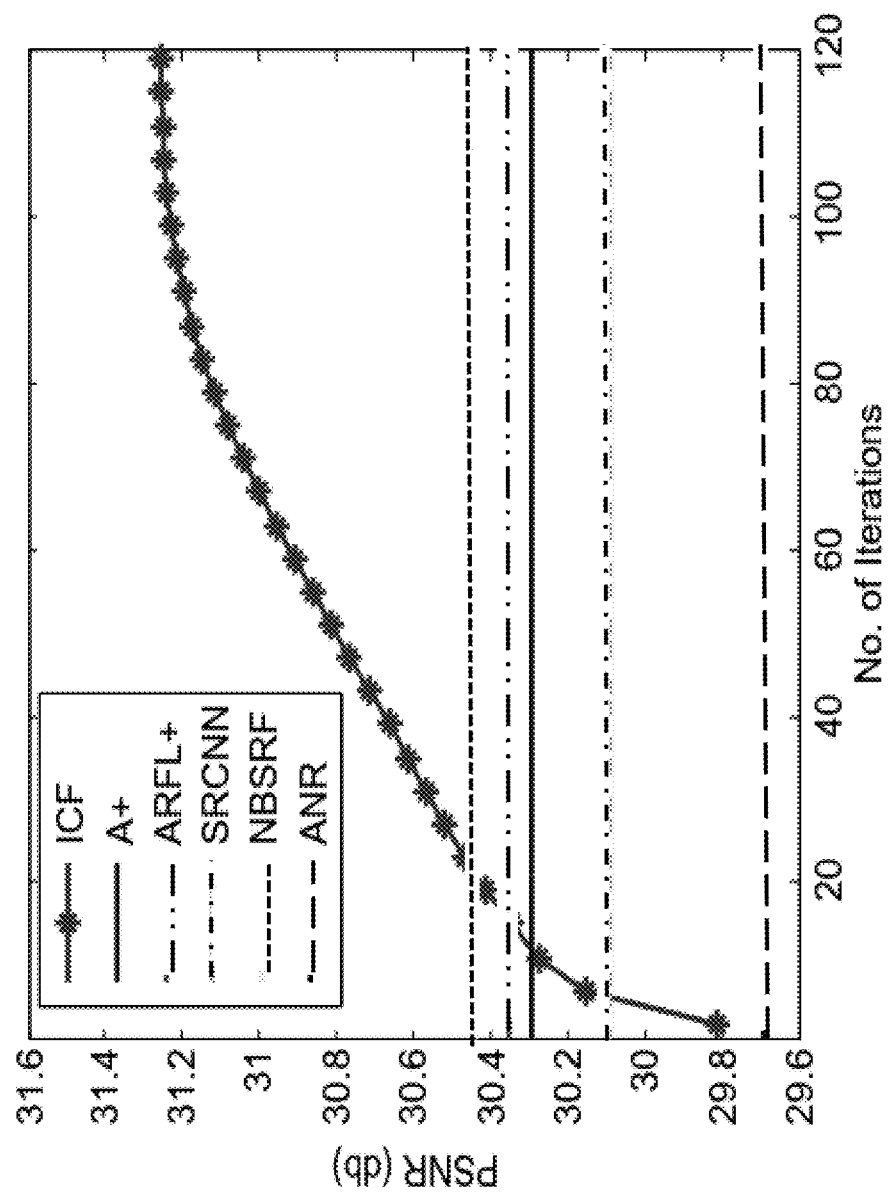
FIG. 7 illustrates a comparison in peak signal to noise performances between the iterative collaborative filtering approach in accordance with an embodiment of the disclosure and several other image enhancement approaches.

Effect of the number of iterations: the effect of the number of iterations (of high frequency data injection and two-stage collaborative filtering) on the performance of the ICF approach was investigated. The stack size was fixed to 32 in this experiment. FIG. 7 shows the average peak signal to noise ratio (PSNR) of the ICF methods on the images of Set5 for four times upsampling factor. Further, the average PSNR of several other alternative resolution enhancing approaches (Anchored Neighborhood (ANR), Super Resolution using Convolutional Neural Network (SRCNN), Neve Bayes Super-Resolution Forest (NBSRF), ARFL+, and A+) were plotted. It can be observed that just with 20 iterations, the proposed ICF achieves the state-of-the-art performance. With a further increase in iterations the ICF significantly outperforms all of the other approaches. The performance starts saturating around 100 iterations and after 120 iterations no more improvement is observed.

Figure 8:
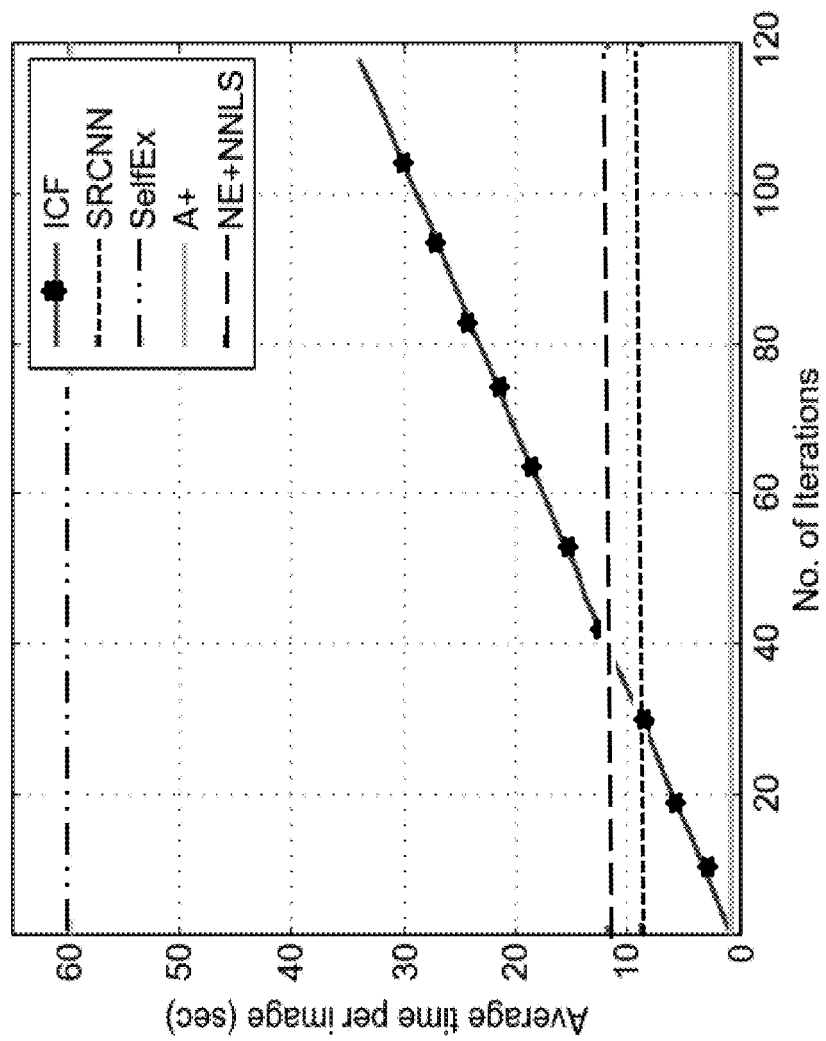
FIG. 8 illustrates the computation time as a function of iterations used in the iterative collaborative filtering in accordance with an embodiment of the disclosure.

Next, the computation time as a function of the number of iterations is shown in FIG. 8. The computation time of several other alternative image enhancement approaches (A+, SRCNN, NE-NNLS, and Self-Exemplars) are also shown in the figure for comparison. As expected, the computation time for the ICF approach increases linearly with the iterations. It can be observed that the proposed ICF approach is computationally more expensive compared to the dictionary based methods in certain instance, for example when compared with the A+ approach, but is much faster than the self-similarity based approach, such as the Self-Exemplars approach. The computation time of SRCNN is the same as ICF with 40 iterations, however, with these iterations the ICF considerably outperforms SRCNN. The number of iterations can provide a tradeoff between the performance and the processing time of the algorithm. All of the experiments were carried out on a Windows 7 machine with Core2Duo processor and 4 Gb RAM.

Set cardinality (stack size): the effect of set cardinality K (the number of matching blocks required for each reference block) on the performance of the algorithm was investigated. Since Haar transform was used along the third dimension in the stack, the values of the stack can be increased in powers of 2. Table 2 below shows the performance of the ICF approach with different stack sizes for Set5 and Set14. It can be observed that the performance improves with an increase in the stack size. There is a significant gain in the performance as the size is increased from 2 to 32. For Set5 the performance improves by more than 2 decibel (db), while for Set14 it increases by more than 1.5 db. It supports the idea that matching blocks that are identified based on a group of mutually similar patches is much stronger than the individual patches. Further, it can be observed that there is a slight drop in performance for Set5 as the stack size changes from 32 to 64. It is possibly because with 64 stack size reference patches in high texture regions select some non-similar patches. In order not to further increase the complexity, the stack size is fixed to 32 in all our experiments.

TABLE 2

Effect of stack size on the performance.

| | Stack size | | | | |
|---|---|---|---|---|---|
| | 2 | 4 | 8 | 16 | 32 | 64 |
| Set5 (db) | 28.95 | 30.20 | 30.81 | 31.09 | 31.26 | 31.19 |
| Set14 (db) | 26.38 | 27.16 | 27.52 | 27.73 | 27.89 | 27.93 |

Comparison with alternative approaches: The performance of the proposed ICF approach is compared with six alternative approaches for single image super resolution, on three different datasets. Three upsampling factors s=2,3,4 were used for Set5 and Set14, while two upsampling factors s=2,4 were used for Urban 100 Dataset. PSNR is used as the evaluation metric. The results of the proposed ICF approach were compared with Bicubic, ANR, SRCNN, A+, ARFL+, NBSRF, and Self-Exemplar (SrEx). Table 3 shows the quantitative results for Set5, Set14 and Urban 100 Dataset. It can be observed that the proposed ICF approach outperforms all of the other methods for all tested upsampling factors. Except for the SrEx approach, all other methods used for comparison are dictionary based. The proposed ICF method gains by around 0.7-1 db over the self-similarity based SrEx on Set5 and by 0.5-0.7 db on Set 14, implying that the collaborative processing of the mutually similar patches provides a much stronger prior than the single most similar patches from the input image. The proposed ICF approach outperforms SrEx on Urban 100 dataset by more than 1 db for upsampling factor 2. The superior performance of the proposed ICF approach in the Urban 100 dataset implies it is particularly suited for images which have high number of edges.

TABLE 3

The comparison of performance on Set5, Set14 and Urban.

| Dataset | Factor | Bicubic | ANR | SRCNN | A+ | ARFL+ | NBSRF | SrEx | ICF |
|---|---|---|---|---|---|---|---|---|---|
| Set5 | 2 | 33.66 | 35.83 | 36.34 | 36.55 | 36.89 | 36.76 | 36.50 | 37.21 |
| | 3 | 30.39 | 31.92 | 32.39 | 32.59 | 32.72 | 32.75 | 32.62 | 33.44 |
| | 4 | 28.42 | 29.69 | 30.09 | 30.29 | 30.35 | 30.44 | 30.33 | 31.25 |
| Set14 | 2 | 30.23 | 31.80 | 32.18 | 32.28 | 32.52 | 32.45 | 32.23 | 32.84 |
| | 3 | 27.54 | 28.65 | 29.00 | 29.13 | 29.23 | 29.25 | 29.16 | 29.69 |
| | 4 | 26.00 | 26.85 | 27.20 | 27.33 | 27.41 | 27.42 | 27.40 | 27.89 |
| Urban | 2 | 26.66 | — | 28.65 | 28.87 | — | — | 29.05 | 30.16 |
| | 4 | 23.12 | — | 24.14 | 24.34 | — | — | 24.67 | 25.01 |

The proposed ICF approach outperforms the dictionary based approaches as well. For the upsampling factor of 4, ICF gains by more than 0.8 db over the second best result on Set5. In comparison to A+, the ICF gains almost 1 db. On dataset Set14, the ICF approach gains up to 0.5 db compared to the second best results. On Urban 100 dataset, the proposed ICF approach gains by a big margin over the dictionary-based approaches. The superior performance over the dictionary-based approaches indicates that the self-similar image based priors, although less in number, are very powerful, and can outperform the dictionaries learned over millions of patches.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method of enhancing a resolution of an original image, the method comprising:
    resizing the original image to a larger size, the resized image divided into a first plurality of reference blocks;
    enhancing a resolution of the resized image by iteratively:
        injecting high frequency data into the resized image to obtain a high frequency data injected resized image;
        for each reference block in the first plurality of reference blocks:
            extracting, from the high frequency data injected resized image, a first plurality of matching blocks that meet a mutual similarity condition with respect to the reference block, wherein each of the first plurality of matching blocks is from within the high frequency data injected resized image; and
            adjusting the high frequency data of the reference block based on a correlation between the reference block and the first plurality of matching blocks.

2. The method of claim 1, further comprising for each reference block in the first plurality of reference blocks, jointly adjusting the high frequency data of the reference block and the first plurality of matching blocks as a group so that components of the high frequency data that are consistent in the group are retained while components of the high frequency data that are inconsistent in the group are removed.

3. The method of claim 2, wherein jointly adjusting the high frequency data of the reference block and the first plurality of matching blocks as a group comprises:
    aligning the reference block and the first plurality of matching blocks on top of each other to generate a three-dimensional (3D) array of pixels; and
    performing a 3D transformation on the 3D array of pixels to generate corresponding 3D spectra.

4. The method of claim 3, wherein the 3D transformation comprises at least one of the following: a Discrete Cosine Transform, a Haar Transform, or an Identity Transform.

5. The method of claim 3, wherein the 3D transformation comprises a two-dimensional (2D) image transform and a one-dimensional (1D) image transform, and wherein performing the 3D transformation on the 3D array of pixels comprises applying the 2D image transform to pixel values along a first dimension and a second dimension of the 3D array of pixels; and applying the 1D image transform to pixel values along a third dimension of the 3D array of pixels.

6. The method of claim 3, wherein jointly adjusting the high frequency data of the reference block and the first plurality of matching blocks as a group further comprises:
    modifying at least some spectral coefficients in each of the 3D spectra based at least in part on corresponding coefficient standard deviations; and
    applying, to the 3D spectra, an inverse transform to generate high resolution estimates for the resized image.

7. The method of claim 1, wherein each reference block in the first plurality of reference blocks is in a first size, wherein the method further comprises:
    dividing the resized image into a second plurality of reference blocks, wherein each reference block in the second plurality of reference blocks is in a second size smaller than the first size;
    in at least one iteration of enhancing the resolution of the resized image, for each reference block in the second plurality of reference blocks:
        extracting, from the high frequency data injected resized image, a second plurality of matching blocks that meet a mutual similarity condition with respect to the reference block;
        adjusting the high frequency data of the reference block based on a correlation among the reference block and the second plurality of matching blocks; and
    modifying the second size after performing $n^{th}$ iterations of enhancing the resolution of the resized image, wherein n is a whole real number.

8. The method of claim 1, further comprising identifying the first plurality of matching blocks for the reference block, wherein the identifying the first plurality of matching blocks comprises:
    defining a local search area that is a portion of the resized image and that at least partially surrounds the reference block;
    identifying, within the local search area, a number of matching blocks that meet the mutual similarity condition with respect to the reference block;
    determining that the number of identified matching blocks is less than a pre-determined threshold;
    expanding the local search area; and
    identifying, within the expanded local search area, an additional matching block that satisfy the mutual similarity condition with respect to the reference block, wherein the identifying the first plurality of matching blocks is performed before enhancing the resolution of the resized image.

9. The method of claim 1, further comprising generating the high frequency data based on pixel data of the resized image, wherein the generating the high frequency data is further based on a difference between the resized image and the original image, and wherein the plurality of reference blocks are either distinct, non-overlapping pixel blocks of the resized image, wherein each reference block comprises a plurality of contiguous pixels, or wherein at least two matching blocks of the plurality of matching blocks are partially overlapping.

10. A system for enhancing a resolution of an original image, the system comprising:
    an image interface comprising circuitry configured to receive the original image; and
    a processor communicatively coupled with the image interface and configured to:
        resize the original image to a larger size, the resized image divided into a first plurality of reference blocks;
        enhance a resolution of the resized image by iteratively:
            injecting high frequency data into the resized image to obtain a high frequency data injected resized image;
            for each reference block in the first plurality of reference blocks:

extracting, from the high frequency data injected resized image, a first plurality of matching blocks that meet a mutual similarity condition with respect to the reference block, wherein each of the first plurality of matching blocks is from within the high frequency data injected resized image; and adjusting the high frequency data of the reference block based on a correlation between the reference block and the first plurality of matching blocks.

11. The system of claim 10, wherein the processor is further configured to, for each reference block in the first plurality of reference blocks, jointly adjust the high frequency data of the reference block and the first plurality of matching blocks as a group so that components of the high frequency data that are consistent in the group are retained while components of the high frequency data that are inconsistent in the group are removed.

12. The system of claim 11, wherein jointly adjusting the high frequency data of the reference block and the first plurality of matching blocks as a group comprises:

aligning the reference block and the first plurality of matching blocks on top of each other to generate a three-dimensional (3D) array of pixels; and performing a 3D transformation on the 3D array of pixels to generate corresponding 3D spectra.

13. The system of claim 12, wherein the 3D transformation comprises:

at least one of the following: a Discrete Cosine Transform, a Haar Transform, or an Identity Transform;

a two-dimensional (2D) image transform and a one-dimensional (1D) image transform, wherein performing the 3D transformation on the 3D array of pixels comprises applying the 2D image transform to pixel values along a first dimension and a second dimension of the 3D array of pixels; and applying the 1D image transform to pixel values along a third dimension of the 3D array of pixels.

14. The system of claim 12, wherein jointly adjusting the high frequency data of the reference block and the first plurality of matching blocks as a group further comprises:

modifying at least some spectral coefficients in each of the 3D spectra based at least in part on corresponding coefficient standard deviations; and applying, to the 3D spectra, an inverse transform to generate high resolution estimates for the resized image.

15. The system of claim 10, wherein each reference block in the first plurality of reference blocks is in a first size, wherein the processor is further configured to:

divide the resized image into a second plurality of reference blocks, wherein each reference block in the second plurality of reference blocks is in a second size smaller than the first size;

in at least one iteration of enhancing the resolution of the resized image, for each reference block in the second plurality of reference blocks:

extract, from the high frequency data injected resized image, a second plurality of matching blocks that meet a mutual similarity condition with respect to the reference block; and adjust the high frequency data of the reference block based on a correlation among the reference block and the second plurality of matching blocks; and wherein the processor is further configured to modify the second size after performing $n^{th}$ iteration of enhancing the resolution of the resized image, wherein n is a whole real number.

16. The system of claim 10, wherein the processor is further configured to identify the first plurality of matching blocks for the reference blocks, wherein identifying the first plurality of matching blocks comprises:

defining a local search area that is a portion of the resized image and that at least partially surrounds the reference block; and identifying, within the local search area, a number of matching blocks that meet the mutual similarity condition with respect to the reference block, and wherein identifying the first plurality of matching blocks further comprises:

determining that the number of identified matching blocks is less than a pre-determined threshold;

expanding the local search area; and identifying, within the expanded local search area, an additional matching block that satisfy the mutual similarity condition with respect to the reference block.

17. The system of claim 16, wherein the processor is further configured to identify the first plurality of matching blocks before enhancing the resolution of the resized image.

18. The system of claim 10, further comprising an image sensor communicatively coupled with the image interface and configured to capture image data of a scene, wherein the processor is further configured to:

generate the high frequency data based on pixel data of the resized image, and/or generate the high frequency data based on a difference between the resized image and the original image.

19. The system of claim 10, wherein the plurality of reference blocks are distinct, non-overlapping pixel blocks of the resized image, wherein each reference block comprises a plurality of contiguous pixels.

20. The system of claim 10, wherein at least two matching blocks of the plurality of matching blocks are partially overlapping.

* * * * *

UNITED STATES PATENT AND TRADEMARK OFFICE
CERTIFICATE OF CORRECTION

| | | |
|---|---|---|
| PATENT NO. | : 11,403,733 B2 | Page 1 of 1 |
| APPLICATION NO. | : 16/033132 | |
| DATED | : August 2, 2022 | |
| INVENTOR(S) | : Rakesh Mehta and Karen Egiazarian | |

It is certified that error appears in the above-identified patent and that said Letters Patent is hereby corrected as shown below:

In the Specification

In the Detailed Description:
In Column 20, Line 60, change "Neve Bayes" to --Naïve Bayes--.

Signed and Sealed this
Twenty-first Day of January, 2025

Coke Morgan Stewart
*Acting Director of the United States Patent and Trademark Office*